United States Patent
LaGrotta et al.

(10) Patent No.: US 8,121,617 B1
(45) Date of Patent: Feb. 21, 2012

(54) METHOD OF REMOTELY LOCATING A MOBILE DEVICE EQUIPPED WITH A RADIO RECEIVER

(76) Inventors: James Thomas LaGrotta, Boonton Township, NJ (US); Richard Thomas LaGrotta, Livingston, NJ (US); Carly Elisa LaGrotta, Livingston, NJ (US)

( * ) Notice: Subject to any disclaimer, the term of this patent is extended or adjusted under 35 U.S.C. 154(b) by 325 days.

(21) Appl. No.: 12/653,016

(22) Filed: Dec. 7, 2009

Related U.S. Application Data

(60) Provisional application No. 61/201,204, filed on Dec. 9, 2008.

(51) Int. Cl.
  *H04W 24/00* (2009.01)
(52) U.S. Cl. ............ 455/456.1; 455/456.2; 455/456.3; 455/457; 455/404.1; 455/404.2; 455/440; 342/357.21; 342/357.25; 705/14.58; 705/14.64; 370/310; 370/335
(58) Field of Classification Search ....... 455/456.1–457, 455/404.1–404.2, 412, 440; 342/357.21, 342/357.25; 705/14.57, 14.64; 370/310, 370/335
See application file for complete search history.

(56) References Cited

U.S. PATENT DOCUMENTS

| 6,085,090 A * | 7/2000 | Yee et al. ................. 455/440 |
| 7,728,724 B1 * | 6/2010 | Scalisi et al. ............. 340/539.13 |

* cited by examiner

*Primary Examiner* — Kamran Afshar
*Assistant Examiner* — Manpreet Matharu

(57) ABSTRACT

A method of remotely locating a mobile device equipped with a radio receiver by remotely and securely activating the device's ringer and location system, and communicating such location to the device owner.

19 Claims, 5 Drawing Sheets

METHOD OF REMOTELY LOCATING A MOBILE DEVICE EQUIPPED WITH A RADIO RECEIVER

CROSS REFERENCE TO RELATED APPLICATION

This application claims the benefit of U.S. Provisional Application No. 61/201,204, filed on Dec. 9, 2008, incorporated herein by reference.

TECHNICAL FIELD OF THE INVENTION

The present invention is directed to a method of remotely locating a mobile device equipped with a radio signal receiver.

BACKGROUND OF THE INVENTION

Numerous portable or mobile devices generate an audible signal upon occurrence of a particular event. These devices include mobile telephones, personal digital assistants (PDAs), laptop computers, digital media players, like MP3 players, etc. The invention is not limited to particular ones of such devices. An audible sound feature of a mobile device should be silenced when the mobile device is located in certain environments, such as a theater, school or church and wherever persons, animals or objects in its vicinity should not be disturbed by sound from the mobile device. The device may be set to silence the audible signal, such as a ring tone, or the device may be set to vibrate only without producing an audible signal. Upon the silenced mobile device or a person carrying the device leaving one of the environments, the person carrying the device may forget to restore or may delay restoring the audible signal feature volume on the mobile device. A person may misplace his mobile device or leave it behind when he leaves a location. The device is now set not to provide a ring or only to vibrate.

A common solution for locating a mobile device is for the person, particularly a searcher, trying to locate it to call the mobile device if it is or includes a telephone or to send an electronic message from another telephone or other transmitting device in the hope of locating the mobile device by someone hearing the audible signal feature of the mobile device that has been called. Unfortunately, in cases when the audible signal feature is silent, the person searching for the mobile device cannot locate the device by this method. Also, when the mobile device is left at another location than the one from which the searcher is calling, the caller will not hear the audible signal feature even if the caller is able to activate that feature by a telephone call, or the like.

SUMMARY OF THE INVENTION

The present invention provides a method of remotely controlling the mobile device audible sound feature settings and volume by using a caller ID or identification function already in or specially programmed into the mobile device, such as that function which is present now in mobile telephones, and by installing specialized firmware programmed in the mobile device and tied with a unique service intended to remotely cause the mobile device audible signal feature to generate a selected, preferably maximum, volume audible signal or a visible signal for an extended period of time, to enable location of the mobile device. The invention provides a secure method of performing this audible sound or visible signal generation feature change so that inadvertent or unintended adjustments to the audible sound feature volume or other elements of a sound pattern or a visible signal may be avoided.

The present invention also concerns apparatus which can perform the method, including programming installed in the mobile device to perform the method and programming at a below described central calling authority to attempt to locate the mobile device upon a searcher looking for the mobile device activating performance of the method steps by the central calling authority.

Also, if the mobile device being sought is equipped with a global positioning system-based location function, or the mobile device service provider has an alternate means of determining the physical location of the mobile device, then the actual location of the mobile device may be made known to the central calling authority and that authority can also provided to the person searching for the device with information about its location within the accuracy afforded by such features or methods.

BRIEF DESCRIPTION OF THE DRAWINGS

For a more complete understanding of the present invention, reference is now made to the following descriptions taken in conjunction with the accompanying drawings of one exemplary embodiment of the invention, in which.

DETAILED DESCRIPTION

The present invention provides a method of remotely controlling a mobile device's audible signal feature volume by using a caller ID identification function such as a caller ID programmed in the mobile device 20 that is tied to a unique service offering from a central calling authority 10 which is able to remotely adjust the mobile device's audible signal feature, for example, to a selected volume or its maximum volume and/or to for example, adjust the audible signal pattern and/or to adjust a visible signal for an extended time period for a searcher locating the mobile device. Alternatively, some other content change or unusual patterns or audible signal from the device may be enabled. The invention provides for a secure method of performing this mobile device audible signal feature volume, pattern, or visible signal, etc. change so that inadvertent or unintended adjustments to the audible signal feature volume or pattern and to the audible signal feature producing a sound or to a visible signal can be avoided.

Figure 5:
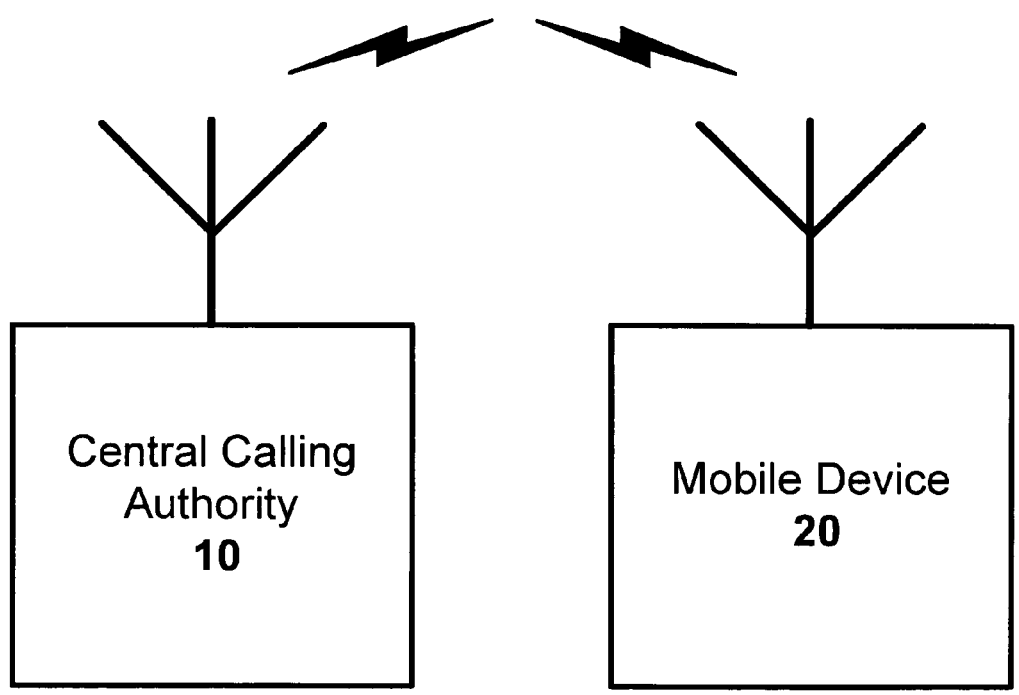
FIG. 5 is a block diagram of an example embodiment of a central calling authority and a mobile device.

The description herein uses a mobile telephone as an example of a mobile device 20 (FIG. 5) according to the invention. But, the invention concerns any mobile device configured to be capable of receiving and acting in response to radio or electrical signals transmitted through the air, via a telephone call, a text message, or the Internet, or other known communication means.

Two distinct elements are provided to allow this new service and feature to be added to mobile device systems. The first element is a central calling authority 10 (FIG. 5), which is an entity that is programmed to interface with the mobile device owner, make wireless or electrical contact with the mobile device 20 being sought and receive and pass unique security codes and location information back and forth with the device. The second element is a change to the mobile device firmware or other devices in the mobile device by applicable programming to enable the mobile device to answer or respond to a call from a unique calling number or caller, which can be identified by the mobile device caller ID identification feature, and then causes the mobile device to operate its audible signal or visible signal feature, preferably for a defined period of time, and to implement any other programmed mobile device location actions.

The Figures and the descriptions herein describe one implementation of the invention which utilizes a telephone call from the person searching for such a mobile device to an entity called herein a central calling authority, which is to be followed by a telephone call from the central calling authority to the mobile device. Any of the communication paths can be independently mutually exclusively replaced by applicable programming with text messages (via short message service), Web-based services, or other forms of communications services, as appropriate for each of respective communication path and for the respective mobile device being sought. The steps described below are performed respectively either on the mobile device, and particularly on its medium for storing its programming, or by a programmed apparatus associated with the central calling authority.

Figure 1:
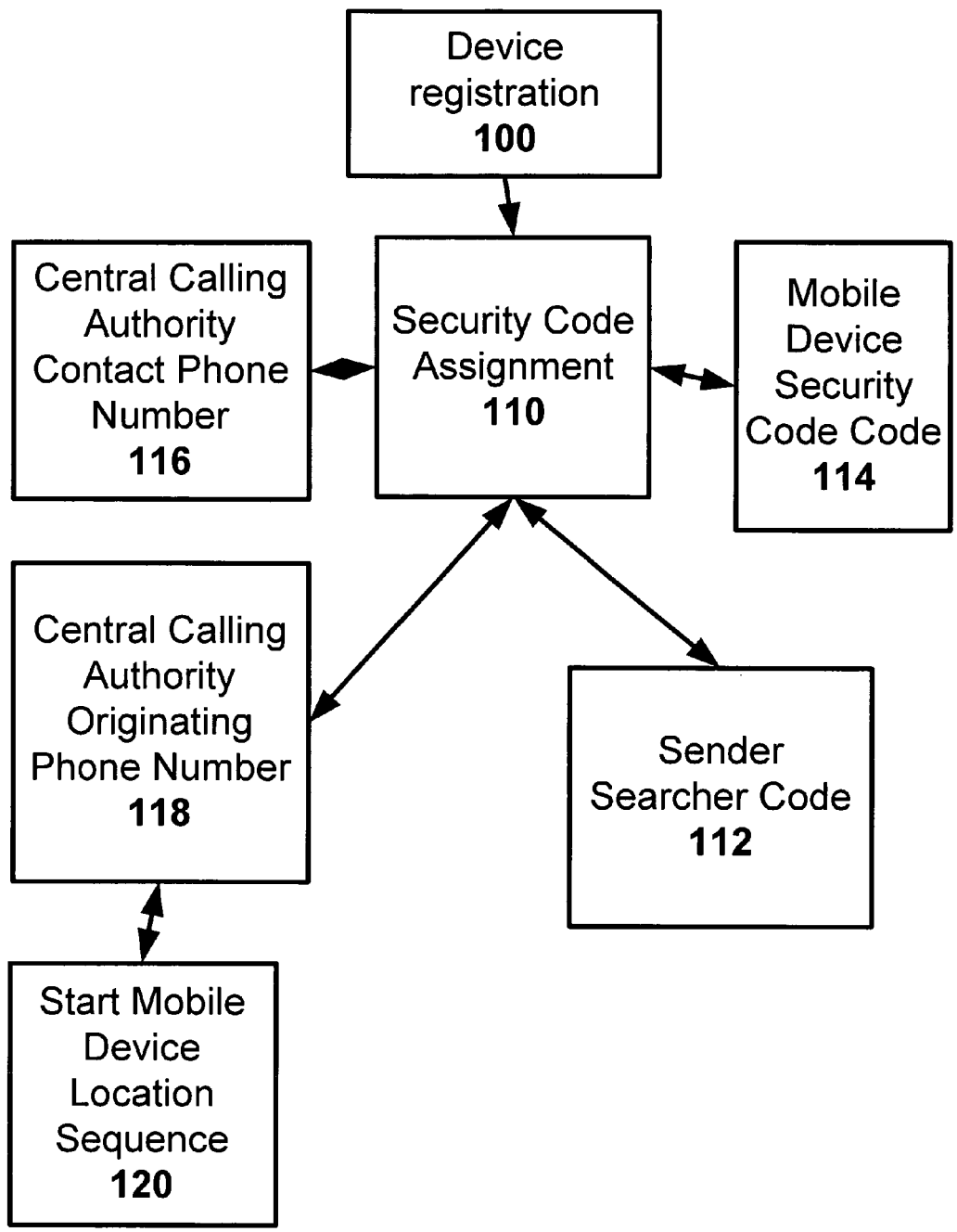
FIG. 1 is a flow diagram of the central calling authority registration process.

FIG. 1 shows a flow diagram of the central calling authority registration process, describing the steps that a mobile device owner may follow to register a mobile device, which may be later sought, with the central calling authority. During initiation of the registration process 100, the central calling authority conducts an assignment 110, preferably by two unique security codes relating to the device owner. The first code is an owner identification or sender/searcher security code which can be used by a searcher seeking the mobile device to uniquely identify himself when he calls the central calling authority to start the device location sequence. The second code 114 is the mobile device security code which is a unique code that the owner of the mobile device programs 130 (FIG. 2) into the mobile device so that when the central calling authority calls the mobile device, the mobile device identifies the caller's number and detects that the call is an authenticated request to begin the device location sequence.

The central calling authority may also provide the owner of the mobile device with two telephone numbers. The first number is called the central calling authority contact phone number 116, which requests the authority to start the mobile device location sequence. The second number is called the central calling authority originating phone number 118, which is the telephone number or identification number or signal from which the central calling authority will call and which the mobile device's caller identification feature will use. The latter number 118 causes the mobile device to start its portion of the device location sequence 120. Note that the central calling authority originating telephone number may be embedded in the mobile device security code, if desired, since the person seeking the device need not be aware of this telephone number.

Figure 2:
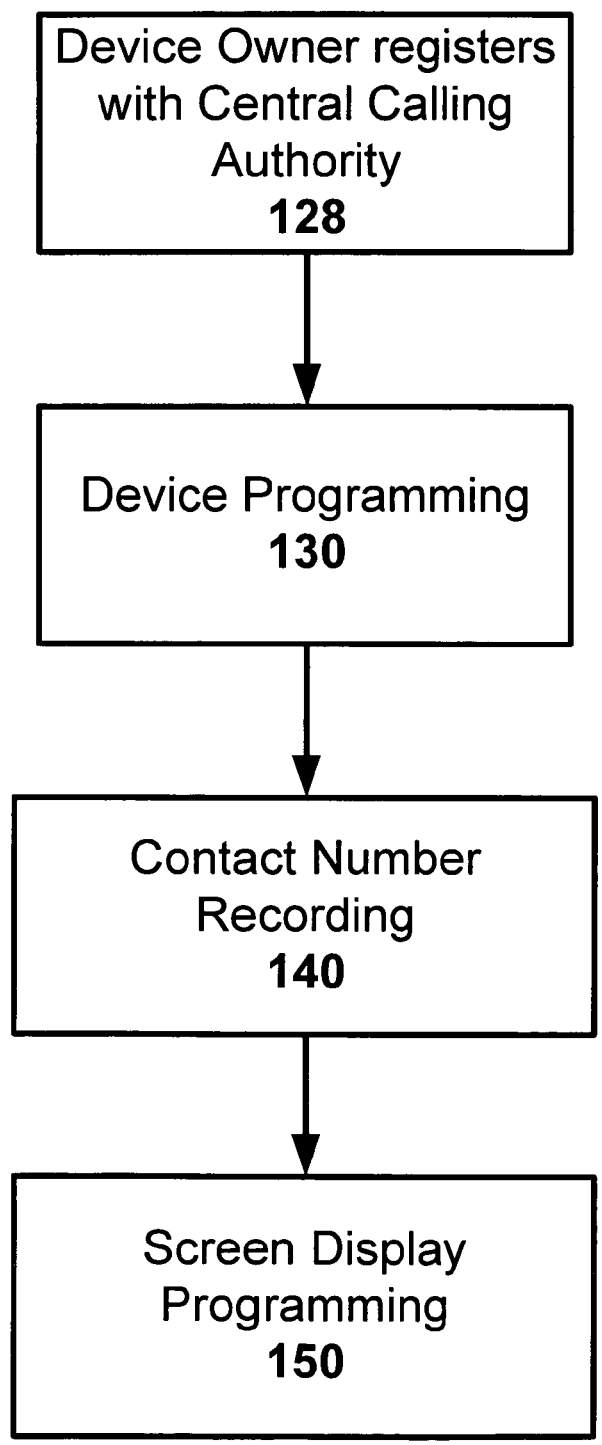
FIG. 2 is a flow diagram of the owner initialization process.

FIG. 2 is a flow diagram of the owner initialization process. The device owner completes registration of the device with the central calling authority 128. The device owner programs the central calling authority originating phone number 118 and the mobile device security code 112 into the mobile device 130. The owner should record the central calling authority contact phone number and owner identification security code (OSIC) for future reference 140.

Figure 3:
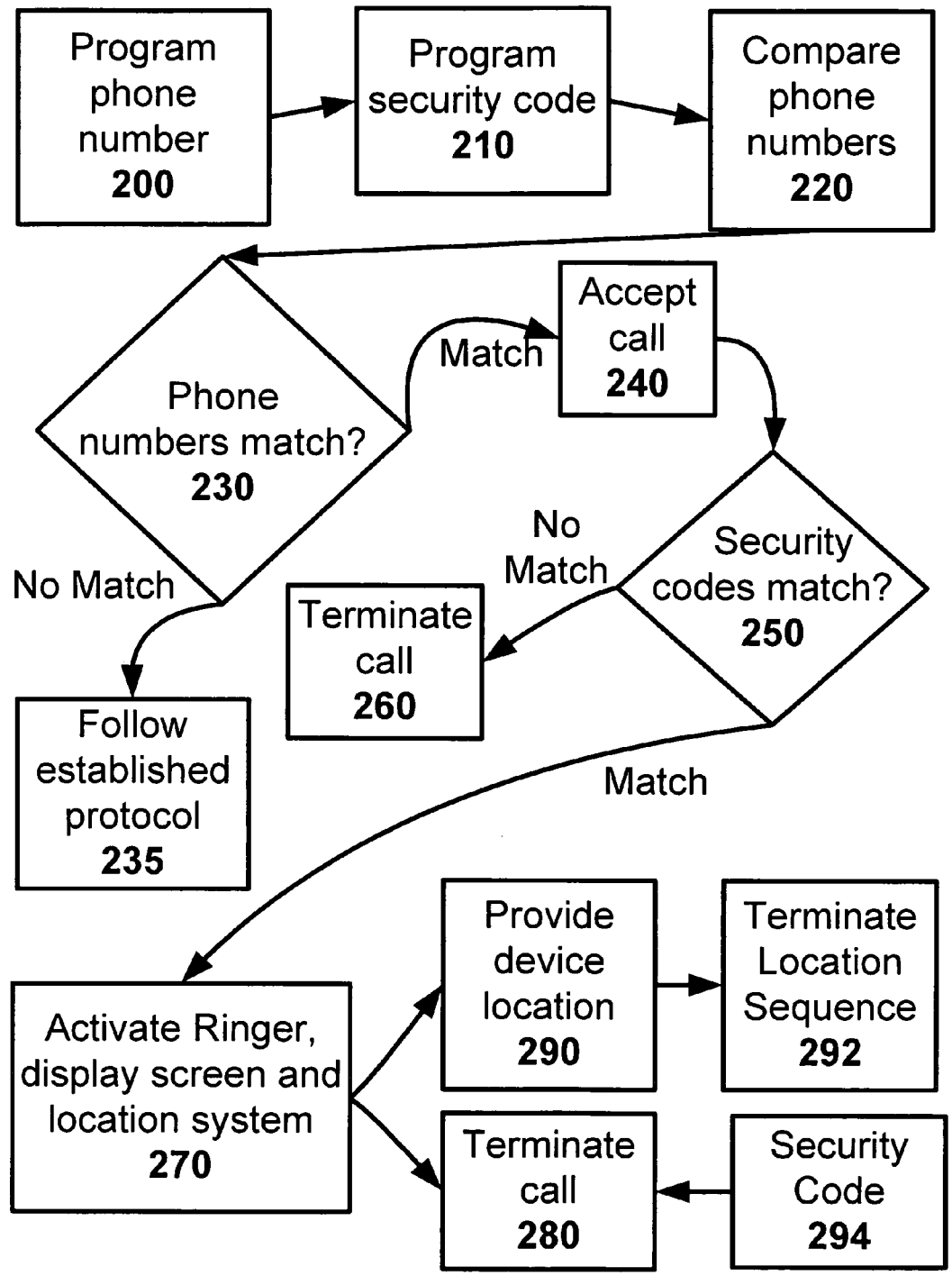
FIG. 3 is a flow diagram of the mobile device setup and operation.

Prior to the initialization process in FIG. 2, the firmware in the mobile device is modified per the specification and set forth in FIG. 3. FIG. 3 is a flow diagram representing steps associated with the mobile device setup and operation. In order to allow the mobile device to adjust its audible signal feature volume or other search assist characteristics, such as frequency of signal elements, including rings or sound and/or light, on command from the central calling authority. Several changes and additions may be made, e.g., to the mobile device's firmware or other components which store instructions for the device. Provision is made to program the central calling authority originating phone number 200 and mobile device security code 210 into the mobile device.

When any telephone call is received, the mobile device firmware checks the caller identification number associated with the incoming call 220. Many mobile devices may have been previously programmed to perform this function to operate the feature of a unique ringer pattern for calls from different incoming numbers 235. If the incoming call is identified as coming from the central calling authority (i.e. the central calling authority originating phone number is detected as the incoming phone number) 230, the call is automatically accepted by the mobile device and the normal protocol takes place to establish a voice call communication path 240.

Once the communication path has been established, the central calling authority transmits the mobile device security code to the mobile device. The mobile device compares the received version of the mobile device security code to the stored version of the mobile device security code 250. If the codes do not match, the call is terminated 260.

If the codes match, the mobile device starts the device location sequence 270 that, for example, turns on the mobile device's audible signal feature at maximum volume for a period of "X" minutes, with "X" being a variable that could be fixed, preset during the initial service registration, and/or provided by the owner during the call to the central calling authority that started the particular instance of the device location sequence. "X" may be set to keep the mobile device ringing or sending some audible or visible pattern continuously or at intervals until the searcher finds the mobile device and terminates the device location sequence 280, or the mobile device's battery runs out of power or is removed or for a preset time interval. For security and to prevent unauthorized termination of the location sequence, while permitting the searcher or a person with authority to terminate the location sequence, to terminate the location sequence, the device may first have to be provided an identification security code, e.g., the original code for that device that was transmitted to the device during the device location sequence. The mobile device is programmed to then enable such termination.

The mobile device's global positioning system-based location feature (or other feature that the service provider utilizes for determining the physical location of the mobile device), if any is present in the device, is also turned on and programmed to transmit the mobile device location to the central calling authority, and the mobile device is programmed so that its display screen will display an owner-provided message 270 before terminating the call 280. The central calling authority provides the location to the searcher 290, if it has been determined.

Upon finding the mobile device, the searcher enters a command or performs an action to terminate the device location sequence 292, including by simply turning off the mobile device. The termination of the device location sequence could be controlled by a security feature for example, requiring the owner identification security code, or other code 294, to be entered into the mobile device that had been located to terminate the device location sequence to prevent persons other than the owner from terminating the device location sequence. Also, the owner may program the mobile device 270 with desired information to be displayed on the screen of the mobile device when the device location sequence is active. This may enable a person in the vicinity of the mobile device, who is alerted to it by the audible signal or light feature or other pattern, to be provided with information that would assist a person who sees the information to learn steps to alert the searcher and to cause the mobile device to be returned to the searcher. Such information might include an address, an e-mail address, a telephone number, or other information selected by the owner 150.

Although the foregoing states that turning off the mobile device, which stops reception of all calls by the mobile device, thereby makes the feature described above inoperable, the mobile device may be additionally programmed to treat a call signal from the programmed call number of the central calling authority as an instruction to override the turn off and become reactivated in order to perform the device location sequence. However, if the power source or battery has been removed from the mobile device, this addition will not operate.

One example of a way to enable the mobile device to respond to a call from the central calling authority when the mobile device had been earlier turned off is described. The mobile device is programmed to include a low-power, listen-only mode that acts more like a conventional listen-only pager which runs for weeks on a battery. This can be set up in several ways. The feature is always active and cannot be disabled. This works well on a mobile device from which the battery cannot be removed. A variant for a device with a removable main battery is to provide a small, non-removable battery in the device that still performs the function even if the main battery is removed. The owner could be given the option of disabling the feature using the security code. But, this reduces the ability to find the device. In either case, once the device receives the signal, from the central calling authority, the device is programmed to turn fully on to participate in the device location sequence, to the extent it can. Also, the central calling authority could ask the owner or searcher where the phone might be to limit the broadcast of the pager-like signal to a smaller geographical area, which can later be expanded and does not need to be contiguous (e.g., at home or a recent visited place). Particularly for mobile telephones that are on and actively communicating with the network, the network knows which cell site is closest to the phone, which is how it knows where to direct normal incoming calls.

Figure 4:
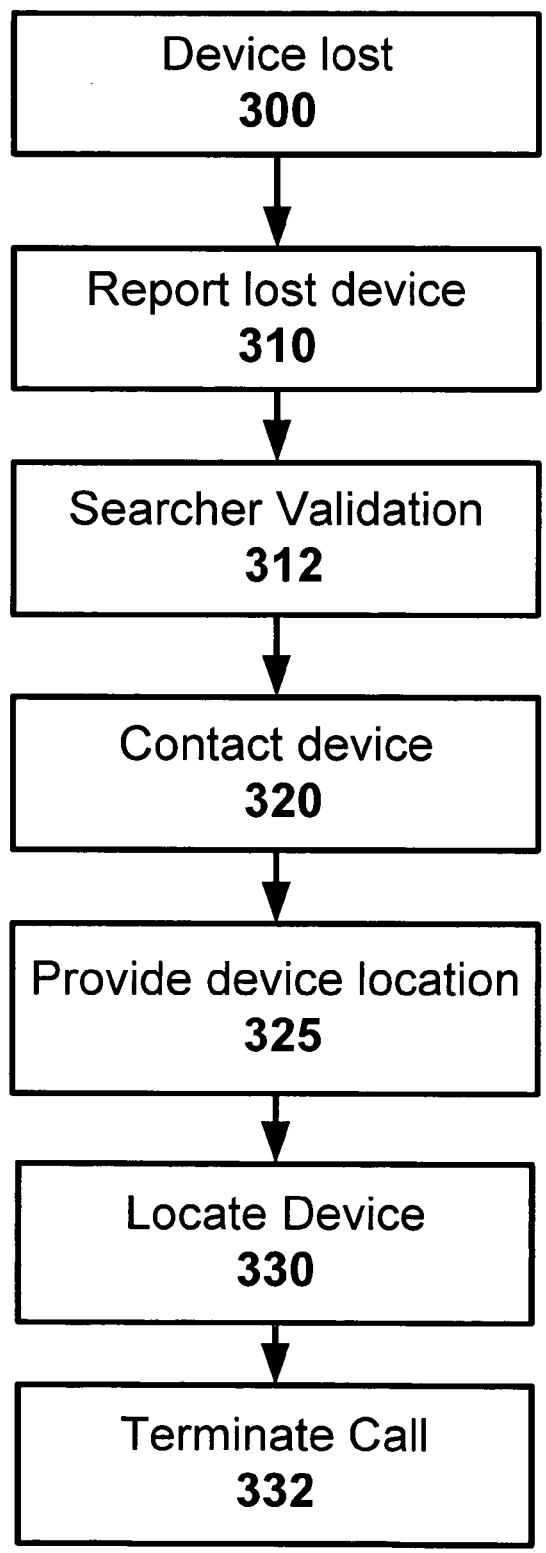
FIG. 4 is a flow diagram demonstrating the mobile device location sequence.

FIG. 4 is a flow diagram demonstrating the mobile device location sequence. Upon the eventual searcher for, or owner, of the mobile device discovering that the mobile device is lost 300, the searcher calls the central calling authority to start the device location sequence 310. The central calling authority validates the searcher 312 by the searcher providing the owner identification security code. Once the searcher's identity is confirmed, the central calling authority calls the mobile device 320 to start the device location sequence and transmits the mobile device security code to the mobile device to activate the audible signal feature or sound pattern preferably to its full volume 320 or activates the visible signal. The central calling authority also initiates determination of the physical location of the mobile device using available geo-location methods that the mobile device enables and provides location information to the searcher 325. The searcher terminates the call 332 with the central calling authority and the searcher may locate the mobile device using the audible signal feature sound or other signal and using any location information provided by the central calling authority 330.

Although the present invention has been described in detail and via a preferred embodiment, those skilled in the art should understand that they can make various changes, substitutions and alterations herein without departing from the spirit and scope of the invention in its broadest form. Therefore, the scope of the invention is limited by the following claims.

We claim:

1. A method for remotely and securely locating a mobile device which contains a wireless receiver having a signal generation feature and on which the feature has been deactivated or is set at a level below a level of maximum noticeability,
the method comprising performing a mobile device location sequence, comprising
contacting a central calling authority to initiate a search for the mobile device,
after the contacting, providing a preestablished identification security code for the mobile device to the central calling authority;
the central calling authority attempting to communicate with the mobile device via a selected originating call number and
the mobile device receiving a communication from the central calling authority and then using a preprogrammed caller-identification function of the mobile device to identify the communication as coming from the central calling authority by the mobile device identifying the incoming identification number as the central calling authority originating identification number, and the mobile device being activated by the communication from the central calling authority to then receive a mobile device security code;
the central calling authority then transmitting the mobile device security code to the mobile device, the mobile device validating the code and then starting a sequence to turn on the mobile device's signal generation feature to a condition configured to attract attention to the mobile device.

2. The method of claim 1, further comprising terminating the device location sequence at the mobile device after the mobile device is located.

3. The method of claim 1, further comprising: activating a global positioning system receiver in the mobile device for causing the mobile device to transmit its location determined by the global positioning system to the central calling authority or to the mobile device; and
providing the mobile device location to a searcher.

4. The method of claim 1, further comprising initiating the device location sequence by at least one of a searcher's voice call to the central calling authority by a searcher using the Internet to send a message to the central calling authority, and by a searcher sending a text message to the central calling authority.

5. The method of claim 1, further comprising implementing the device location sequence by at least one of a voice call to the mobile device from the central calling authority and by a text message to the mobile device from the central calling authority.

6. The method of claim 1, wherein the signal generation feature comprises an audible sound feature or a visible signal.

7. The method of claim 6, further comprising setting the duration of the audible sound or the visible signal feature operating during a device location sequence.

8. A method of establishing and operation of a central calling authority to have and use an ability to securely and remotely operate a signal generating feature of a mobile device, the method comprising the following steps:
   the central calling authority providing to the mobile device a mobile device location sequence service comprising:
   the central calling authority assigning two security codes for the mobile device, including
   an identification security code to be received by the central calling authority when a searcher for the mobile device contacts the central calling authority; and upon receiving the identification security code, the central calling authority attempting to contact the mobile device to cause the mobile device to initiate a device location sequence;
   and further including the central calling authority providing a central calling authority originating calling number which is to be programmed into the mobile device, and
   the central calling authority providing contact information for a searcher to use to enable a searcher for the mobile device to initiate a device location sequence in the mobile device via at least one of a telephone number to call, a texting address and an internet website.

9. The method of claim 8, wherein the central calling authority initiates a call to the mobile device and transmits the mobile device security code for initiating a device location sequence.

10. The method of claim 8, wherein the mobile device security code is programmed into the mobile device.

11. A method of programming and operating a mobile device, which is capable of generating an identification signal, to generate the signal when a searcher is locating the device, the method comprising
   programming the mobile device with a mobile device location sequence that may be activated in the mobile device;
   programming the mobile device with a mobile device security code; programming a selected calling number into the mobile device so that the mobile device can recognize the selected calling number;
   programming the mobile device to initiate the device location sequence upon the mobile device receiving a call from the programmed calling number and also receiving the mobile device security code, and the device location sequence being designed to generate a visible or audible identification signal selected to attract the attention of a person or object in the vicinity of the mobile device to enable location of the mobile device.

12. The method of claim 11, further comprising programming the mobile device to terminate the device location sequence by operating on the mobile device to terminate the device location sequence or by turning off the mobile device.

13. The method of claim 11, wherein the mobile device is programmed to terminate the device location sequence by the searcher entering an owner identification security code, which was transmitted to the mobile device during the device location sequence, into the mobile device, for preventing termination by persons not using that security code whereby the identification signal feature will resume operation once the mobile device is reactivated until the device location sequence is terminated.

14. A mobile device which is capable of generating an identification signal, the mobile device comprising an electronic signal receiving element operable to receive electronic signals from a remote source and a signal generating device for generating an audible or visible signal from the device, the signal generating device being responsive to an instruction it receives to cause generation of that signal; and
   a programmable medium for the mobile device, the programmable medium being programmed with:
   a mobile device location sequence and the programmable device being operable by an operation signal from a remote location to activate the mobile device location sequence;
   a mobile device security code to be received by the mobile device and the medium being programmed so that upon receipt of the operation signal, the mobile device location sequence is operable to continue the sequence or to halt the sequence;
   a selected calling number, which is keyed to a remote device that sends a call signal to the mobile device and the medium being programmed to receive the call signal from a remote calling device and to recognize the selected calling number;
   and being further programmed:
   to initiate the location sequence upon the mobile device receiving the call signal sent by the programmed calling number to the device and also receiving the mobile device security code; and
   to operate the signal generating device to generate a visible or audible identification signal.

15. The mobile device of claim 14, wherein the programmable medium is in the mobile device.

16. The mobile device of claim 14, wherein the programmable medium is programmed so that upon the device receiving the mobile device security code, the medium is programmed to enable the signal generator to terminate the device location sequence.

17. A central calling authority operable to cause a mobile device remote from the central calling authority to generate a signal, the central calling authority including
   a programmable medium programmed to cause the central calling authority to provide to the mobile device a mobile device location sequence service and to activate the service; the medium being further programmed to assign two security codes for the mobile device, including a central calling authority originating calling number and an identification security code programmed into the medium to be received by the central calling authority;
   wherein the central calling authority is configured to attempt to contact by radio or electronic signal the mobile device in order to cause the mobile device to initiate a device location sequence after the central calling authority receives the identification security code from an outside source;
   the medium is further programmed to provide a central calling authority originating calling number to be transmitted remotely.

18. The central calling authority of claim 16, wherein the medium of the central calling authority is further programmed to provide to a remote location information enabling the remote location to initiate a device location sequence by the action of the central calling authority.

19. The central calling authority of claim 17, wherein the medium of the central calling authority is programmed so that when it receives the identification security code, the medium is configured to cause the central calling authority to send a mobile device security code for initiating a device location sequence in the remote mobile device.

* * * * *